United States Patent
Xenaki et al.

[11] Patent Number: 6,131,423
[45] Date of Patent: Oct. 17, 2000

[54] SAFETY DOOR-LOCKING SYSTEM FOR SWITCHGEAR CABINETS

[75] Inventors: Georg Xenaki, Siebnen; Holmar Schietzsch, Rothrist, both of Switzerland

[73] Assignee: Asea Brown Boveri AG, Baden, Switzerland

[21] Appl. No.: 09/173,697

[22] Filed: Oct. 16, 1998

[30] Foreign Application Priority Data

Oct. 30, 1997 [DE] Germany .......................... 197 47 987

[51] Int. Cl.[7] .................................................. B65D 55/14
[52] U.S. Cl. ..................... 70/158; 70/DIG. 30; 70/254; 70/255; 312/217
[58] Field of Search ........................... 70/158, 159, 160, 70/161, 162, 163, 164, DIG. 30, 254, 255; 312/216, 217, 218, 219; 200/305

[56] References Cited

U.S. PATENT DOCUMENTS

| | | | |
|---|---|---|---|
| 683,835 | 10/1901 | Beckwith | 70/85 |
| 1,098,852 | 6/1914 | Stupar | 70/DIG. 30 |
| 1,705,124 | 3/1929 | Kittle | 70/159 |
| 1,806,643 | 5/1931 | Ohnstrand | 70/84 |
| 2,185,175 | 1/1940 | Adam | 312/218 |
| 3,882,291 | 5/1975 | Chiboroski | 200/50 A |
| 3,887,029 | 6/1975 | Lipschutz et al. | 180/114 |
| 4,624,511 | 11/1986 | Oehme | 312/273 |
| 4,691,948 | 9/1987 | Austin, Jr. et al. | 292/171 |
| 4,835,350 | 5/1989 | Ozu et al. | 200/50 A |
| 5,944,397 | 8/1999 | Zeitler | 312/220 |

FOREIGN PATENT DOCUMENTS

| | | |
|---|---|---|
| 1371331 | 7/1964 | France . |
| 4131328A1 | 3/1993 | Germany . |
| 9419852 U | 3/1995 | Germany . |
| 19617575A1 | 5/1997 | Germany . |
| 19700126A1 | 9/1997 | Germany . |

OTHER PUBLICATIONS

Aktuelle Technik, B+L Verlags AG technical publication.

*Primary Examiner*—B. Dayoan
*Assistant Examiner*—John B. Walsh
*Attorney, Agent, or Firm*—Burns, Doane, Swecker & Mathis, L.L.P.

[57] ABSTRACT

In a safety door-locking system for a switchgear cabinet, in which the electric operating state inside the switchgear cabinet is operationally connected to a locking device of a cabinet door of the switchgear cabinet, it is provided that a position of a switch in the switchgear cabinet is coupled via a mechanical connecting system (9, 10, 11, 12, 4, 5) to a locking linkage of the cabinet door. For this purpose, a rotatably (14*a*) mounted control disc (9) is permanently connected to the switch in the switchgear cabinet (1), the control disc (9) additionally representing the position of the switch. The control disc (9) and a locking rod (4) are operationally connected mechanically via a connecting rod (10) and a connecting angle (11) held between guide pins (12*a, b*) in the locking rod (4), and the locking rod (4) is mounted displaceably (19) for the purpose of locking the locking linkage of the cabinet door.

4 Claims, 3 Drawing Sheets

SAFETY DOOR-LOCKING SYSTEM FOR SWITCHGEAR CABINETS

BACKGROUND OF THE INVENTION

1. Field of the Invention

The invention relates to the field of safety technology for electric switchgear cabinets. The invention proceeds from a safety door-locking system according to the preamble of patent claim 1.

Safety door-locking systems of said type are known, for example, from the notification "Miniatur Sicherheitstutr-schalter" ("miniature safety door switches") in the publication "Aktuelle Technik", No. 5/96, page 397 from B+L Verlags AG.

2. Discussion of Background

Safety door-locking systems for switchgear cabinets in electrical installations, as they are known from the prior art, serve the purpose of operating safely and protect the staff who operate and care for the electrical installations. An example of the simplest type of a safeguarded door lock is locking the switchgear cabinet doors by means of a multiplicity of screw-type systems which can be operated only with a special tool. A decisive disadvantage in such screwing systems is that they can be opened only with a large outlay on time by specialist staff with appropriate equipment, and this is very cumbersome in the case, for example, of a fault inside a switchgear cabinet. In addition, a simple screwing system cannot be coupled to an operating state inside a switchgear cabinet, with the result that it is necessary to set up a safeguarded electric switching state before the cabinet door is opened by the responsible specialist staff.

A locking device which is by far simpler to operate is known by the name of "Kirk Key" locking system. Such a system comprises in a mechanical locking unit at least two mutually coupled locking cylinders with different coding for the associated keys. This requires, for example, that before a switchgear cabinet is opened a first key must be used to set up a position for a grounding switch, whereupon the second key in the locking unit becomes freely operable, said second key thereupon being used to open a cabinet door. If a multiplicity of switchgear cabinets are mechanically locked in this way one after another in a row, opening the last cabinet in the row is also correspondingly time-consuming.

An example, of combined electromechanical locking is shown by the prior art in the notification "Miniatur Sicher-heitsturschalter" ("miniature safety door switches") in the publication "Aktuelle Technik", No. 5/96, page 397 from B+L Verlags AG. Such a variant locking system essentially comprises a door switch which is mounted in the switchgear cabinet and cooperates with a coded key fastened to the cabinet door. In this arrangement, the door switch is electrically controlled, and the key is fixed or released mechanically in the door switch as a function of the control system. It is therefore possible in a simple way to lock or unlock in a controlled fashion a multiplicity of switchgear cabinets in parallel as a logical function of required positions of switches inside the switchgear cabinets. Certainly, the wider, but still limited range of operating temperature is a disadvantage of such locking systems. In addition, said system depends directly on the operational safety of the feeding electric network for the door switches and, moreover, on the operational safety of the connected control system. In addition, an installation of this type is correspondingly intensive in terms of cost and maintenance.

SUMMARY OF THE INVENTION

Accordingly, one object of the invention is to provide a novel safety door-locking system which can be set up with a comparatively reduced outlay as regards costs and installation and which, in addition, is capable of operating while ensuring optimum electric safety independently of an electric supply and/or control and under climatic environmental conditions which are freely selectable.

The object is achieved according to the invention by means of the features of the first claim.

The advantages of the invention consist, inter alia, in that a position of a switch installed in a switchgear cabinet is operationally connected to a locking linkage of the cabinet door by means of mechanical connecting elements. The locking of the cabinet door is therefore logically combined indirectly with the position of the switch.

A particularly preferred embodiment of the invention provides a rotatably mounted control disc which is directly connected to the position of the switch and, in accordance with the switching position, indirectly displaces a locking rod for the purpose of locking or unlocking a switchgear cabinet door. The rotary movement applied when the switch is operated is converted into a horizontal displacement direction for the locking rod by means of a connecting rod attached to the control disc and of a connecting angle. The locking rod is, moreover, connected via a locking lever to the locking linkage of the cabinet door, only the desired states of the switch being possible in an AND-combination with the position of the locking linkage with regard to the greatest possible operational safety.

Further embodiments of the invention are covered by the subclaims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
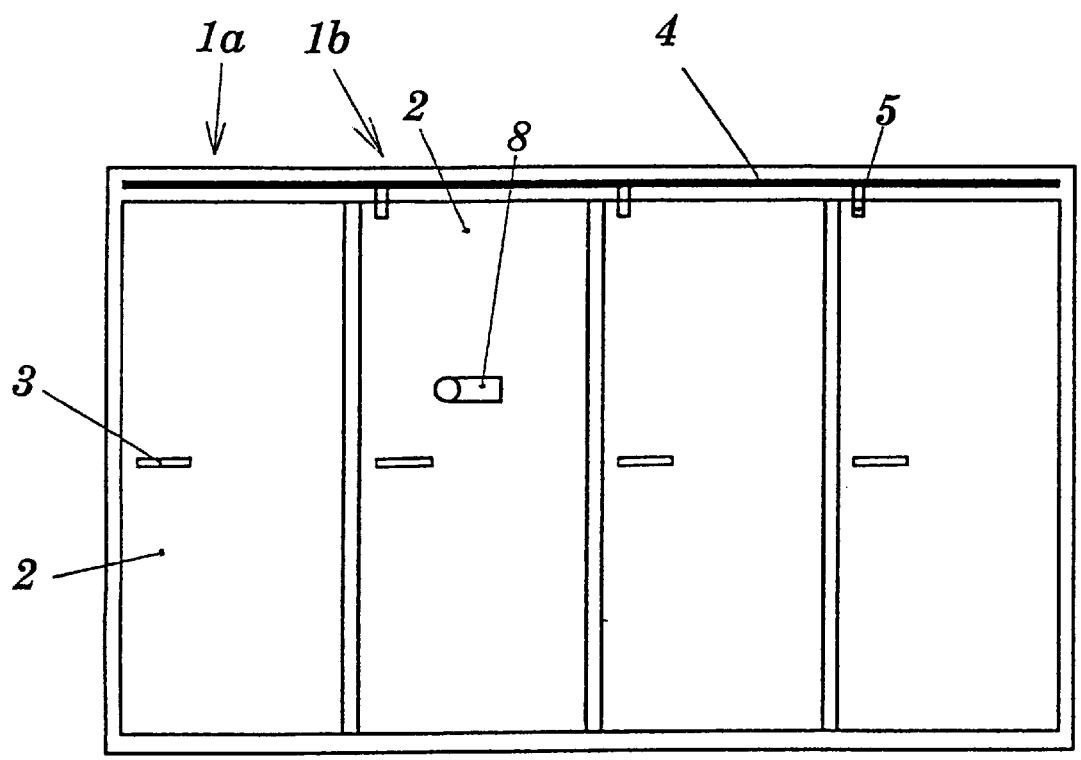
FIG. 1 shows a diagrammatic representation of a cabinet arrangement of a plurality of neighboring switchgear cabinets having the locking system according to the invention.

Referring now to the drawings, wherein like reference numerals designate identical or corresponding parts throughout the several views, in FIG. 1 numeral 1 designates switchgear cabinets for electrical installations, of which, for example, the switchgear cabinet 1a is provided for a low-voltage installation, that is to say requires no special locking device, whereas the switchgear cabinet 1b is provided for a high-voltage installation with a locking device, specifically a locking lever 5. In the case of the example, there is located in the switchgear cabinet 1b a grounding switchs which can be operated outside the switchgear cabinet 1b by means of a switch handle 8 arranged on the cabinet door 2. The entire electric equipment in the switchgear cabinets shown can be connected to ground potential by means of this grounding switch as a result of which it is possible to work safely on the electrical installation inside the switchgear cabinets 1.

All the switchgear cabinets 1b with a high-voltage installation have a common, mechanically controlled locking system connected to the position of the grounding switch, by the switch handle 8. The representation of FIG. 1 shows only the locking rod 4 common to all the switchgear cabinets and the locking lever 5, operationally connected to it, for each switchgear cabinet 1b. As is explained later in more detail, the locking levers 5 are coupled indirectly to the door handles 3 of the switchgear cabinets.

Figure 2:
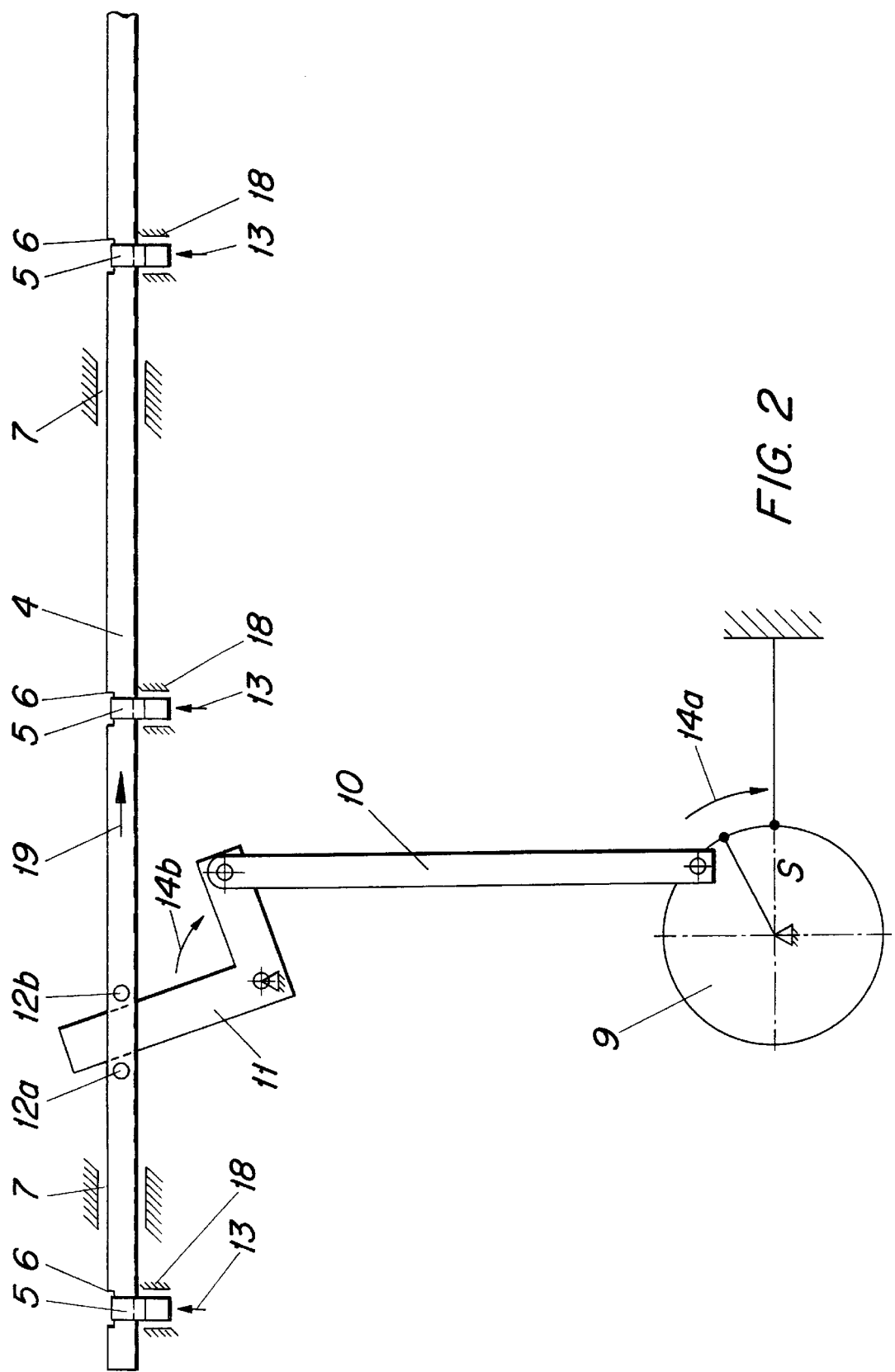
FIG. 2. shows the functional principle of the locking system.

The functional principle of the safety door-locking system according to the invention will now be shown with the aid of FIG. 2. In the process, the representation of the switchgear cabinets will be dispensed with at this juncture in favor of clarity. The switch handle 8 presented in FIG. 1 is connected to a rotatably 14a mounted control disc 9 (FIG. 2). A connecting rod 10 is arranged eccentrically relative to and on this control disc 9. Moreover, the connecting rod 10 is connected to a connecting angle 11, which is likewise rotatably 14b mounted and is arranged at its free end between two guide pins 12a and 12b of the locking rod 4. The locking rod 4 itself is held in guide bearings 7 over its entire length through all the neighboring (not represented) switchgear cabinets.

Each switchgear cabinet 1b to be locked is assigned a locking lever 5, which locking lever 5 is operationally connected to a locking linkage 15 of the cabinet door 2, as explained below with the aid of FIG. 3.

If, as FIG. 2 shows, all the locking levers 5 are in the lower end position in their guide bearings 18, the locking rod 4 is blocked. It cannot be moved in the horizontal direction 19, since the locking levers 5 engage in cutouts 6 in the locking rod and thereby render displacement impossible.

If, by contrast, all the locking levers are brought into their upper end position, that is to say displaced in the direction 13, blocking in the cutouts is neutralized and the locking rod can be moved horizontally 19. This means that the switch handle 8 (FIG. 1) can be used to rotate the control disc 9 in the direction 14a and the connecting angle 11 in the direction 14b, as a result of which, firstly, it is possible to select the position of the grounding switchs FIG. 2 and, in addition, to displace the locking rod 4 for the purpose of locking. That is, the switch S moves from an closed position as shown in FIG. 2, in which the switch S is grounded, to an open position, by rotation of the control disc in the direction 14a.

Figure 3C:
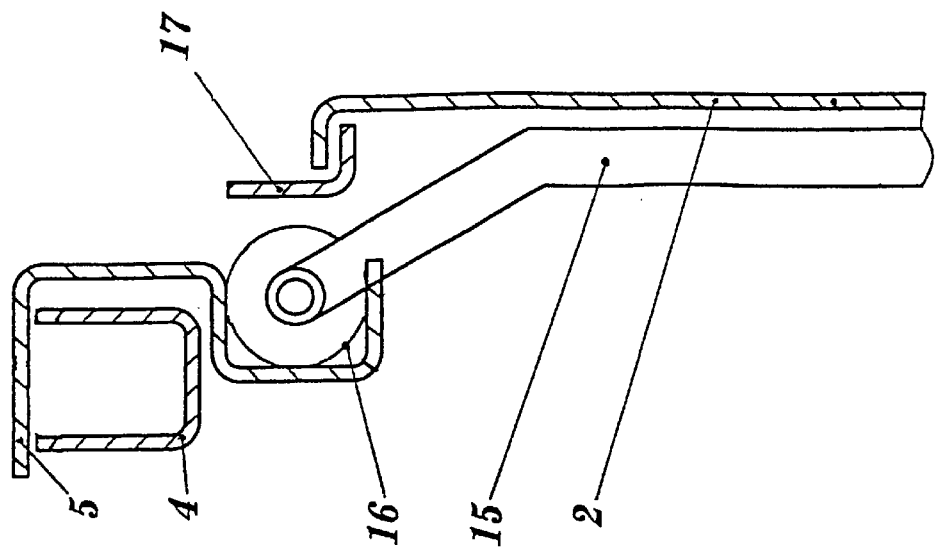
FIG. 3c shows the detail X from FIG. 3a, with the cabinet door unlocked.
Figure 3B:
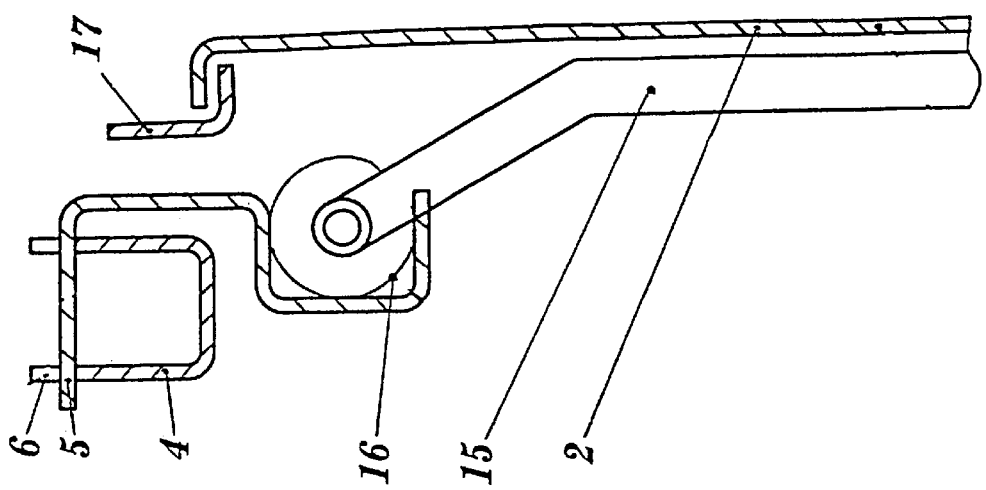
FIG. 3b shows the detail X from FIG. 3a, with the cabinet door locked.
Figure 3A:
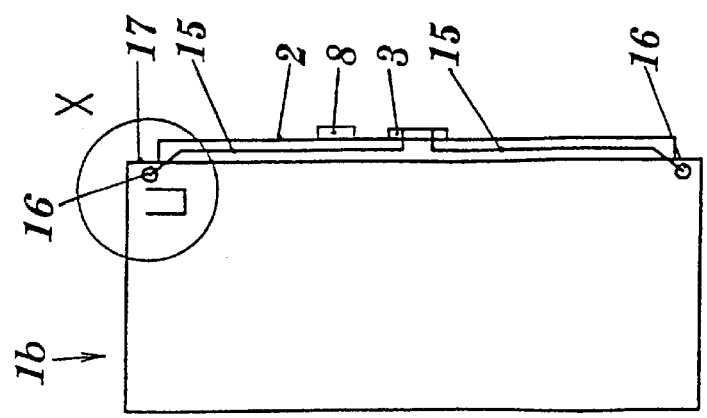
FIG. 3a shows a cross-sectional representation of a switchgear cabinet.

Locking the cabinet doors 2 will now be presented with the aid of FIG. 3. FIG. 3a shows a greatly simplified section through the switchgear cabinet 1b and its door 2. The cabinet door 2 is bounded above and below by sections of the cabinet wall 17. If the cabinet door 2 is locked, locking rollers 16 bear top and bottom, together with the locking linkage 15, against the insides of the cabinet wall 17. The door handle 3 connected to the locking linkage 15 is brought into an appropriate position in order to lock the cabinet door. The detail X in FIG. 3a is shown more precisely in FIG. 3b.

The locking rod 4 is shown in a sectional representation together with a locking lever 5 in FIG. 3b. When the cabinet door 2 is locked, the locking lever 5, which is held by the locking roller 16, is held in its upper end position. If the locking lever 5 is located in this position, the locking rod 4 can be freely displaced 19 at right angles to the plane of the drawing, and the cabinet door cannot be opened, with the locking rod 4 displaced, since the locking lever 5 does not engage in a cutout 6 of the locking rod 4.

If the cutout 6 in the locking rod 4 is positioned such that, as shown in FIG. 3c, the locking lever 5 can engage therein, the locking linkage 15 can be operated to open the cabinet door 2 by the door handle 3 (FIG. 3a). In this case, the grounding switch S is then set up for reliable grounding of all the switchgear cabinet installations. If, as in FIG. 3b, the cabinet door 2 is locked, the switchgear cabinet installations can be ungrounded and put into the operating state.

The safety door-locking system according to the invention ensures reliable and simple locking of cabinet doors, account also being taken of a required three-point locking by having the locking rollers 16 act at top and bottom in the cabinet wall and, in addition, providing a locking bar (which is not represented, because it is sufficiently known) in the lock on the door handle. In addition, because of its robustness, this safety door-locking system which operates purely mechanically also exhibits unlimited possibilities of use with regard to climate.

Without departing from the concept of the invention, it is, of course, also conceivable to implement a door lock of the type shown as a function of an arbitrary switch. It may be pointed out further in this connection that it is possible to couple an arbitrary number of switchgear cabinets in parallel by means of one locking system and, in addition, to extend them in a simple way.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A safety door-locking system for a switchgear cabinet, comprising:

a switch for operational connection to a locking linkage of the cabinet door; and a mechanical connecting system for coupling said switch to said locking linkage, said mechanical connecting system including a rotatably mounted control disc which is permanently connected to said switch and directly relates to the position of the switch for grounding an electric operating state disposed inside the switchgear cabinet upon opening of the switchgear cabinet door wherein the rotatably mounted control disc and a locking rod are operationally connected via a connecting rod and a connecting angle held between guide pins in the locking rod, and wherein the locking rod is mounted displaceably for the purpose of locking the locking linkage of the cabinet door.

2. The safety door-locking system as claimed in claim 1, further comprising:

a locking lever for operationally connecting the locking rod to the locking linkage.

3. The safety door-locking system as claimed in claim 1, further comprising:

at least one switch for operational mechanical connection to locking linkages of a plurality of neighboring switchgear cabinets, said at least one switch being connected by means of at least one locking rod.

4. The safety door-locking system as claimed in claim 1, wherein the switch is a grounding switch.

* * * * *